Feb. 28, 1928.
S. G. DOWN
VEHICLE BRAKE
Filed May 12, 1925
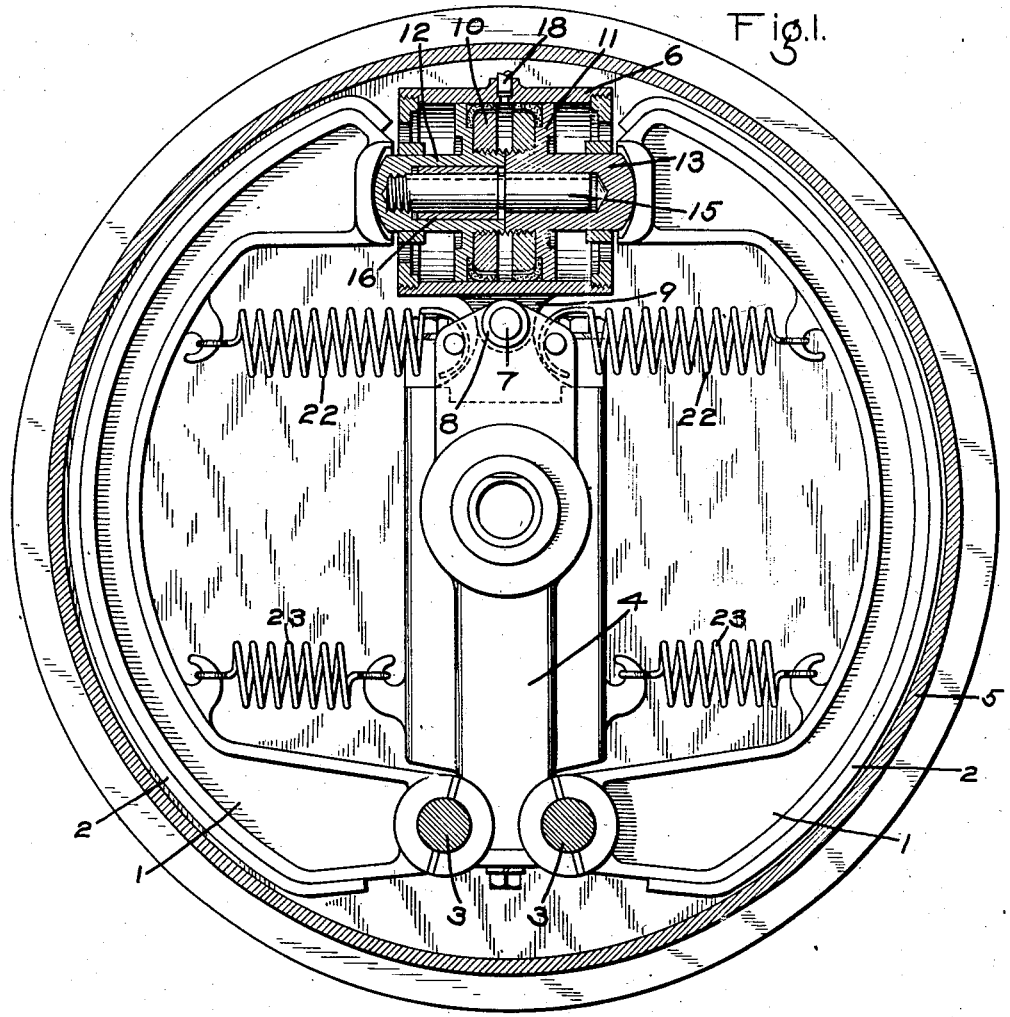
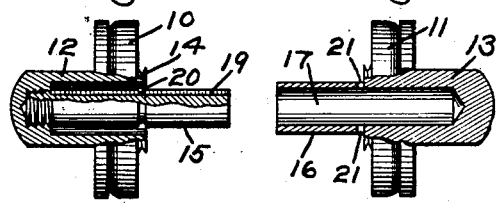
INVENTOR
SIDNEY G. DOWN
BY
ATTORNEY Patented Feb. 28, 1928.

1,660,481

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VEHICLE BRAKE.

Application filed May 12, 1925. Serial No. 29,655.

This invention relates to fluid pressure brakes, and more particularly to a fluid pressure brake construction adapted for use in connection with a brake of the internal expanding drum type, such as is employed on motor vehicles.

The principal object of my invention is to provide an improved brake construction of the above character.

In the accompanying drawing; Fig. 1 is a vertical section of a brake construction of the internal expanding drum type, showing my invention applied thereto; Fig. 2 a side elevation, partly in section, of one of the fluid pressure pistons employed in the Fig. 1 construction; and Fig. 3 a side elevation, partly in section, of the other fluid pressure piston.

The brake construction may comprise a pair of brake heads 1, each having an arcuate face, to which is applied a brake shoe 2. One end of each brake head is supported by a trunnion 3, carried by the steering knuckle 4 of each front wheel of the motor vehicle.

When the brake heads 1 are expanded, the brake shoes 2 are adapted to engage the internal friction face of a brake drum 5, which is secured to the vehicle wheel.

Mounted between the other and adjacent free ends of the brake heads 1 is an open ended cylinder 6, which is pivotally supported by a pivot pin 7 extending through lugs 8 carried by the knuckle 4 and a lug 9 carried by the cylinder 6.

Within the cylinder 6 are disposed pistons 10 and 11 having respective stems 12 and 13 provided with convex ends adapted to engage concave surfaces provided at the free ends of the brake heads 1. The piston 10 and its stem 12 have a central bore 14 and secured within the stem 12 and extending out beyond the piston 10 is a stem 15, which is of less diameter than that of the bore 14.

The piston 11 is provided with an axial sleeve extension 16, and said sleeve extension has a central bore 17 which extends through the piston 11 and into the stem 13. When the pistons 10 and 11 are assembled in the cylinder 6, the stem 15 slidably engages in the bore 17 of piston 11, while the sleeve 16 engages in the bore 14 of piston 10.

A pipe 18 is connected to cylinder 6 and opens to the cylinder chamber intermediate the pistons 10 and 11, and in order to ensure that the full area of the pistons will be subjected to fluid pressure, the stem 15 is provided with a longitudinal groove 19 and an annular groove 20. The sleeve 16 is provided with radial openings 21 which register with the groove 20 when the pistons are in the position shown in Fig. 1. By this construction, fluid under pressure supplied to the chamber between the pistons 10 and 11 will flow through the openings 21, and the grooves 20 and 19 to the outer end of stem 15 and to the outer end of sleeve 16.

It will now be evident that when fluid under pressure is supplied to the space intermediate the pistons 10 and 11 in order to effect an application of the brakes, the pistons will be moved apart and the stems 12 and 13 will act on the free ends of the brake heads 1, so as to expand the heads and thereby cause the brake shoes 2 to frictionally engage the brake drum 2.

When fluid is released from the pistons, springs 22 and 23 act to return the brake heads 1 to release position.

Since the cylinder 6 is not rigidly attached to the steering knuckle, the cylinder is free to adjust itself to prevent binding of the pistons in case the brake heads should not be properly alined.

When a wheel is removed, the cylinder may be easily taken off for inspection, cleaning, and lubrication.

If an axle be designed for several different vehicle weights, a different sized cylinder may be readily applied to suit the weight to be braked.

The same cylinder construction may also be employed both on rear and front wheels.

Having now described my invention, what I claim as new and desire to secure by Letters Patent, is:—

1. In a vehicle fluid pressure brake, the combination with a brake drum and brake heads disposed within said drum, of a cylinder movably supported by the vehicle wheel, and pistons in said cylinder engaging the free ends of said brake heads.

2. In a vehicle fluid pressure brake, the combination with a brake drum and brake heads disposed within said drum, of a cylinder pivotally supported by the vehicle wheel, and pistons in said cylinder engaging the free ends of said brake heads and movable by fluid under pressure for expanding said heads.

3. In a vehicle fluid pressure brake, the combination with a brake drum and brake heads disposed within said drum, of a cylinder pivotally supported by the vehicle wheel, and pistons in said cylinder provided with stems engaging the free ends of said brake heads, said pistons being movable by fluid under pressure to operate said stems and thereby expand said brake heads.

4. In a vehicle fluid pressure brake, the combination with a brake drum and brake heads disposed within said drum, of a cylinder interposed between the free ends of said brake heads, pistons in said cylinder for engaging the free ends of the brake heads, and means associated with said pistons and having telescopic engagement for guiding the pistons.

5. In a vehicle fluid pressure brake, the combination with a cylinder, pistons in said cylinder, and means operated by said pistons for applying the brakes, of a guide stem carried by one piston and having sliding engagement with a bore in the other piston, and a sleeve carried by the other piston and having sliding engagement in a bore in the cooperating piston.

6. In a vehicle fluid pressure brake, the combination with a cylinder, pistons in said cylinder, and means operated by said pistons for applying the brakes, of a guide stem secured to one piston and centrally disposed in a bore of said piston, and a sleeve carried by the other piston and having a central bore for receiving said stem.

7. In a vehicle fluid pressure brake, the combination with a brake drum and brake heads disposed within said drum, of a vehicle front wheel steering knuckle, a cylinder pivoted to said knuckle and interposed between the free ends of said brake heads, and pistons in said cylinder for engaging the free ends of said brake heads.

In testimony whereof I have hereunto set my hand.

SIDNEY G. DOWN.